No. 770,460. PATENTED SEPT. 20, 1904.
C. GLOVER.
COASTER BRAKE.
APPLICATION FILED JULY 16, 1903.
NO MODEL.

Witnesses
Frank S. Ober
R. S. Allyn

Inventor:
Charles Glover
By his Attorney
R. E. Meechum

No. 770,460. Patented September 20, 1904.

UNITED STATES PATENT OFFICE.

CHARLES GLOVER, OF NEW BRITAIN, CONNECTICUT.

COASTER-BRAKE.

SPECIFICATION forming part of Letters Patent No. 770,460, dated September 20, 1904.

Application filed July 16, 1903. Serial No. 165,783. (No model.)

*To all whom it may concern:*

Be it known that I, CHARLES GLOVER, a citizen of the United States, residing at New Britain, county of Hartford, State of Connecticut, have invented certain new and useful Improvements in Coaster-Brakes, of which the following is a full, clear, and exact description.

This invention relates to coaster-brakes.

The purpose of the invention is to provide simple and effective transmission mechanism by which power from a driving source may be transmitted directly to the hub of the vehicle, so that said hub may be rotated in a forwardly direction or so that said driver may be connected with braking mechanism which may be applied to the hub in such manner as to retard or check its progress.

Figure 1:
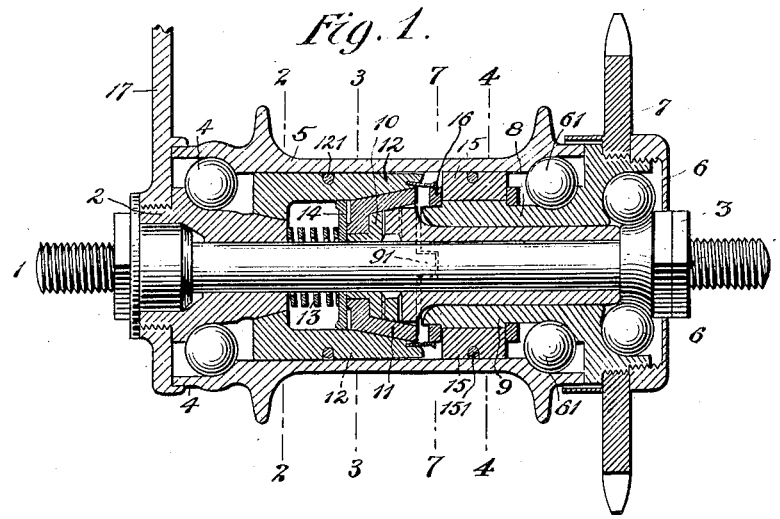
Figures 5, 6:
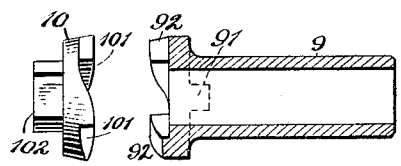
Figure 2:
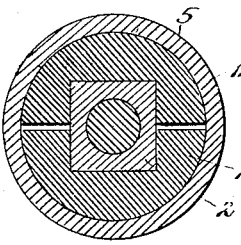
Figure 3:
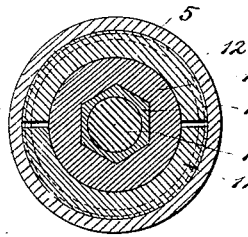
Figure 4:
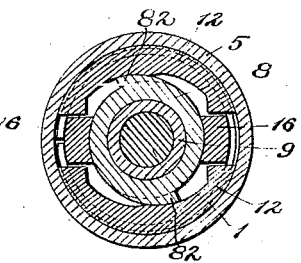
Figures 9, 10:
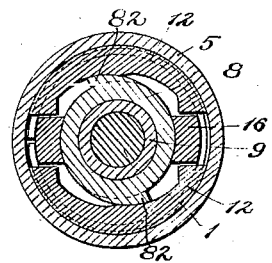
Figures 7, 8:
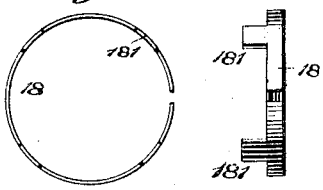

In the accompanying drawings, Figure 1 is a longitudinal section through the center of a wheel-hub fitted with my improved mechanism. Fig. 2 is a section on the plane of the line 2 2, Fig. 1. Fig. 3 is a section on the plane of the line 3 3, Fig. 1. Fig. 4 is a section on the plane of the line 4 4, Fig. 1. Fig. 5 is a side elevation of a detail of construction. Fig. 6 is a longitudinal section of another detail of construction. Fig. 7 is an end view, partly in section, of certain details of construction. Fig. 8 is a side elevation of a detail. Fig. 9 is a perspective view of another detail. Fig. 10 is an end elevation of the detail shown in Fig. 8.

1 is an axle. 2 is a cone mounted thereon. 3 is another cone adjustably mounted thereon. 4 represents ball-bearings for one end of the hub 5.

6 represents ball-bearings for what I shall term a "driver" 7.

61 represents balls located between the adjacent end of the hub 5 and a portion of the driver 7 or an extension thereof.

8 is a driver extension concentric with the axle 1.

9 is a sleeve concentric with the axle 1 and located between said axle and said driver extension. 91, Figs. 1 and 6, is a projection on said sleeve which takes into a recess in said extension to prevent independent rotation of said parts. Any desired number of these projections 91 may be provided.

The end of the sleeve 9 is provided with cams 92 92, which may be provided in any desired number, and facing these cams 92 are cams 101 101 on the part 10, which has an angular extension 102, taking into a tapered sleeve or cone 11, located between brake-shoes 12 12. These brake-shoes 12 12 have squared recesses in the ends and fit over the angular portion of the cone 2, two opposite sides of which may incline, so that when said brake-shoes are moved to the left, as seen in Fig. 1, they will be moved apart.

13 is a spring located between the end of cone 2 and the cone 11 or may be spaced slightly apart from the latter by washer 14.

15 15 are contact-shoes through the medium of which a connection is made between the driver and the hub when it is desired to rotate the wheel forwardly. These brake-shoes are placed in a cage 16, which is mounted on the driver extension 8 and has limited rotative movements relatively thereto. The driver extension 8 has cams 82 82, which extend outwardly, as best seen in Fig. 4. The inner face of each contact-shoe 15 has an inclined face adjacent to the cams 82 82, so that the action of the said cams 82 when the driver extension 8 is rotated forwardly will be to spread said contact-pieces 15 apart and force them into firm engagement with the hub 5.

121 is a spring which may lie in a groove around the brake-shoes 12, said spring tending normally to draw said shoes toward each other. A similar spring 151 may lie in a groove around the brake-shoes 15.

17 is a stationary arm secured to the cone 2 to prevent the rotation thereof.

A spring 18 may be fitted around the end of the cone 11, and points 181 181 may overstand the frame or cage 16, as shown in Fig. 1. The function of this spring is merely to prevent looseness during the act of transferring from the driving to the braking connection, or vice versa. In some instances it might be dispensed with entirely.

The number of brake-shoes or the number of contact-pieces is immaterial to the invention and might be modified in a manner obvious to the mechanic.

From the foregoing it will be observed that when the driver 7 is rotated in an advance direction the cams 82 82 will spread said contact-pieces 15 15 apart, causing them to firmly engage the interior of the hub 5, and thereby effect connection between the driver 7 and said hub, whereby said hub will be advanced with the driver. As soon as driver 7 is stopped the hub 5 continues to rotate forwardly and the cams 82 ride down the inclines on the inner side of the contact-pieces 15, whereby the same are freed from the hub. Should the driver 7 be turned in a reverse direction, the cams 92 92 on the end of the sleeve 9 will ride up the inclines of the cams 101, causing the piece 10 to move to the left as viewed in the drawings. This movement of piece 10 produces a corresponding movement of the cone 11, which tends to spread the brake-shoes 12 12 and force them into engagement with the interior of the hub 5. In this movement of the brake-shoes the inclined portion of cone 2 will move said shoes outwardly, so as to give an extensive even bearing on the interior of the hub 5, effectively checking the rotation of the latter to any degree desired.

From the foregoing it will be seen that the driver is frictionally connected to the hub whenever desired by cam-actuated mechanism. So, also, the brake is frictionally applied by cam-actuated mechanism. This permits of a simple construction, requiring but a few parts, hence attaining the advantages of economy, simplicity, and compactness. As applied to bicycles the mechanism is so compact that it may all be contained within a wheel-hub of the ordinary size.

Of course the brake-shoes 12 12 might be pivoted to the member 2 instead of having the sliding movement shown. In the event of such a modification the moving of the member 11 to the left as shown in Fig. 1 would cause the adjacent ends of the brake-shoes 12 12 to spread and frictionally engage with the hub. Other modifications may be made without departing from the spirit and scope of my invention.

What I claim is—

1. In an apparatus of the character described, a wheel-hub, bearings therefor, an extension from said driver, a rotatable friction device between said extension and the interior of said hub, a frame or cage mounted on the driver extension and preventing lateral displacement of said friction device, said frame having limited rotative movement on said extension, a cam on said extension coacting with said friction device to couple the driver to the wheel-hub when the former is rotated forwardly, a non-rotatable sliding friction device within said hub, and means between said driver extension and said non-rotatable friction device, whereby the latter is moved into contact with the interior of the hub when the driver is rotated.

2. In an apparatus of the character described, a wheel-hub, bearings therefor, a driver, an extension for said driver, means intermediate of said extension and said hub to couple the former to the latter when the driver is advanced, a sleeve coacting with said extension, cams on said sleeve, a second sleeve or cone, cams carried thereby and coacting with the cams on said sleeve, a non-rotatable friction device supported at one end by said sleeve, a stationary inclined supporting bearing for the other end of said friction device, all arranged whereby when the driver is reversed said friction device will be shifted longitudinally and moved outwardly into frictional engagement with the interior of said wheel-hub, and means to restore said parts to their normal inactive position when said driver is brought to a position of rest.

Signed at New Britain, Connecticut, this 14th day of July, 1903.

CHARLES GLOVER.

Witnesses:
G. E. ROOT,
D. E. DEAN.